United States Patent Office 3,334,940
Patented Aug. 8, 1967

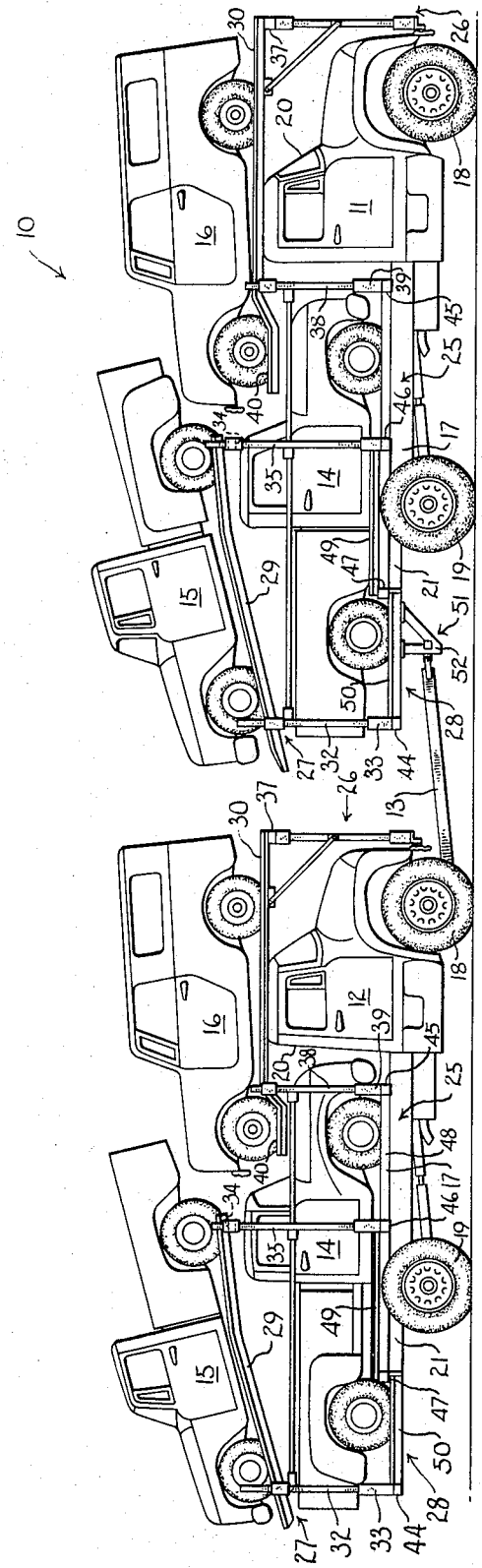

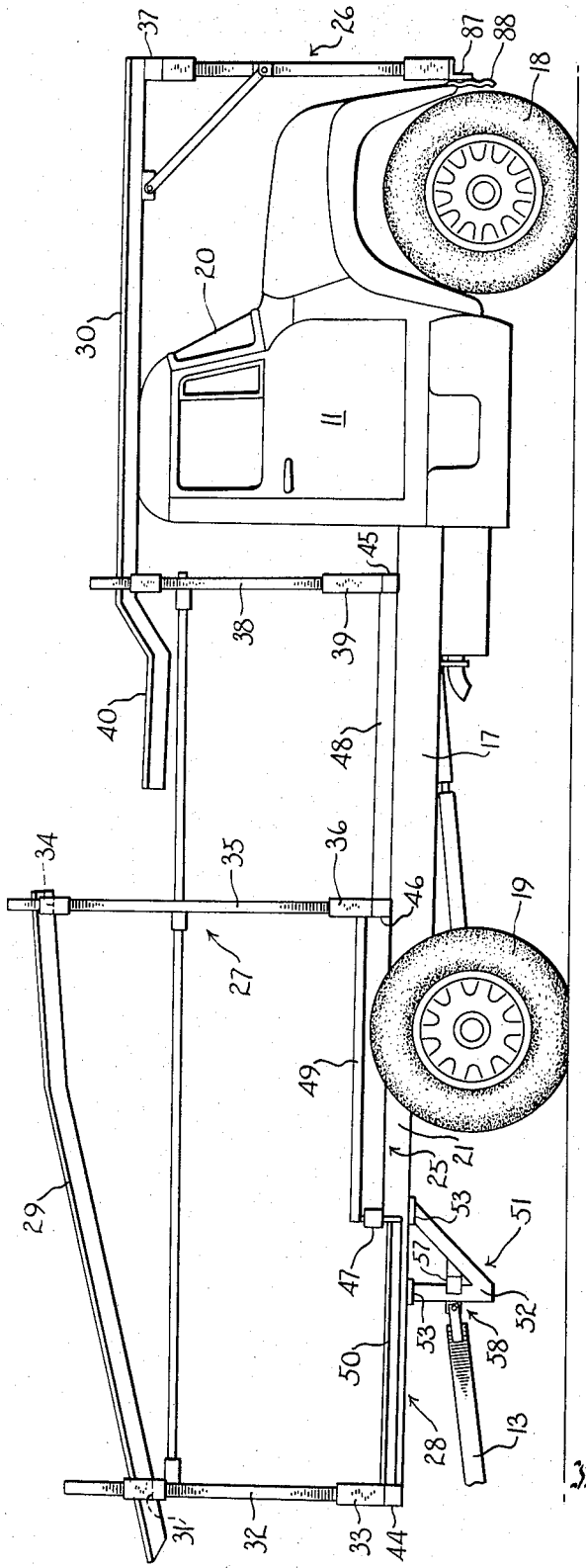

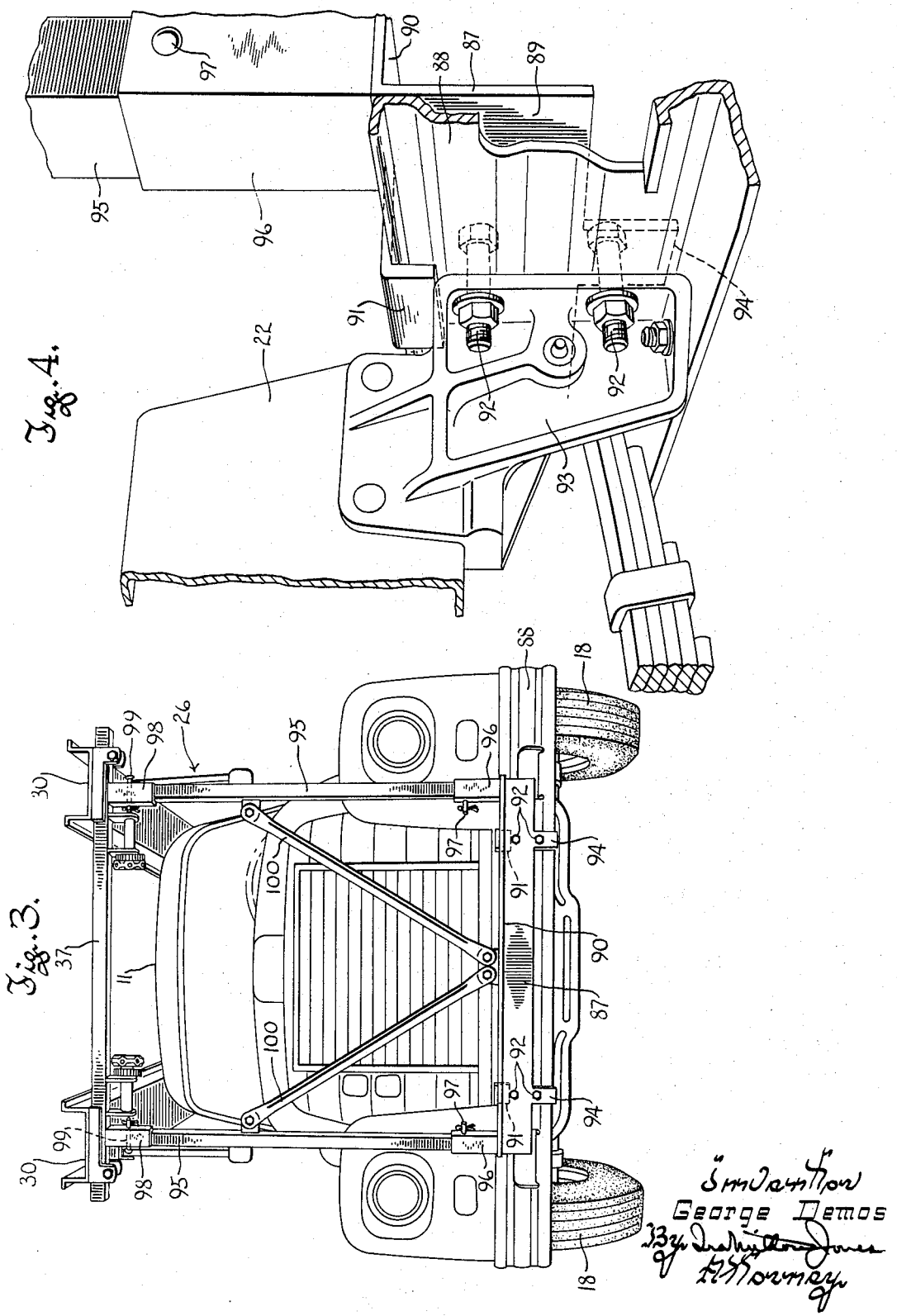

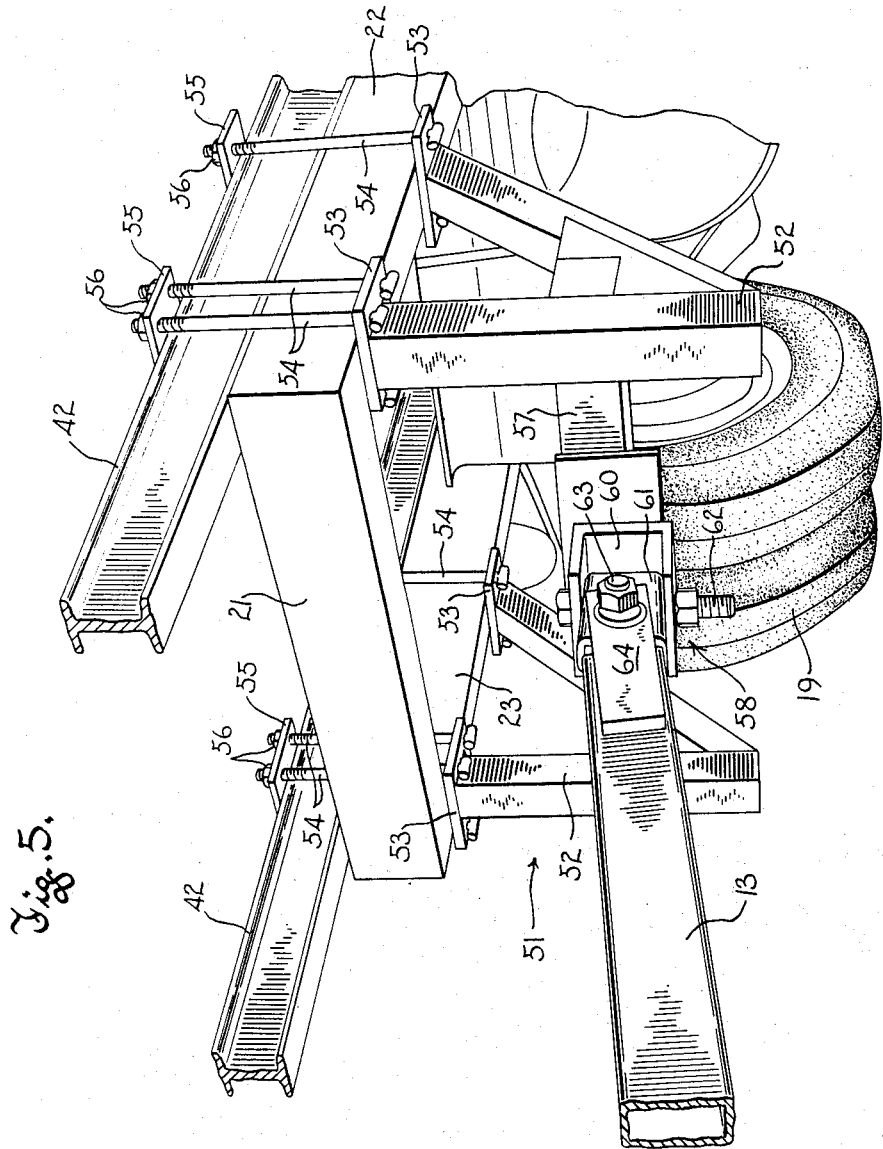

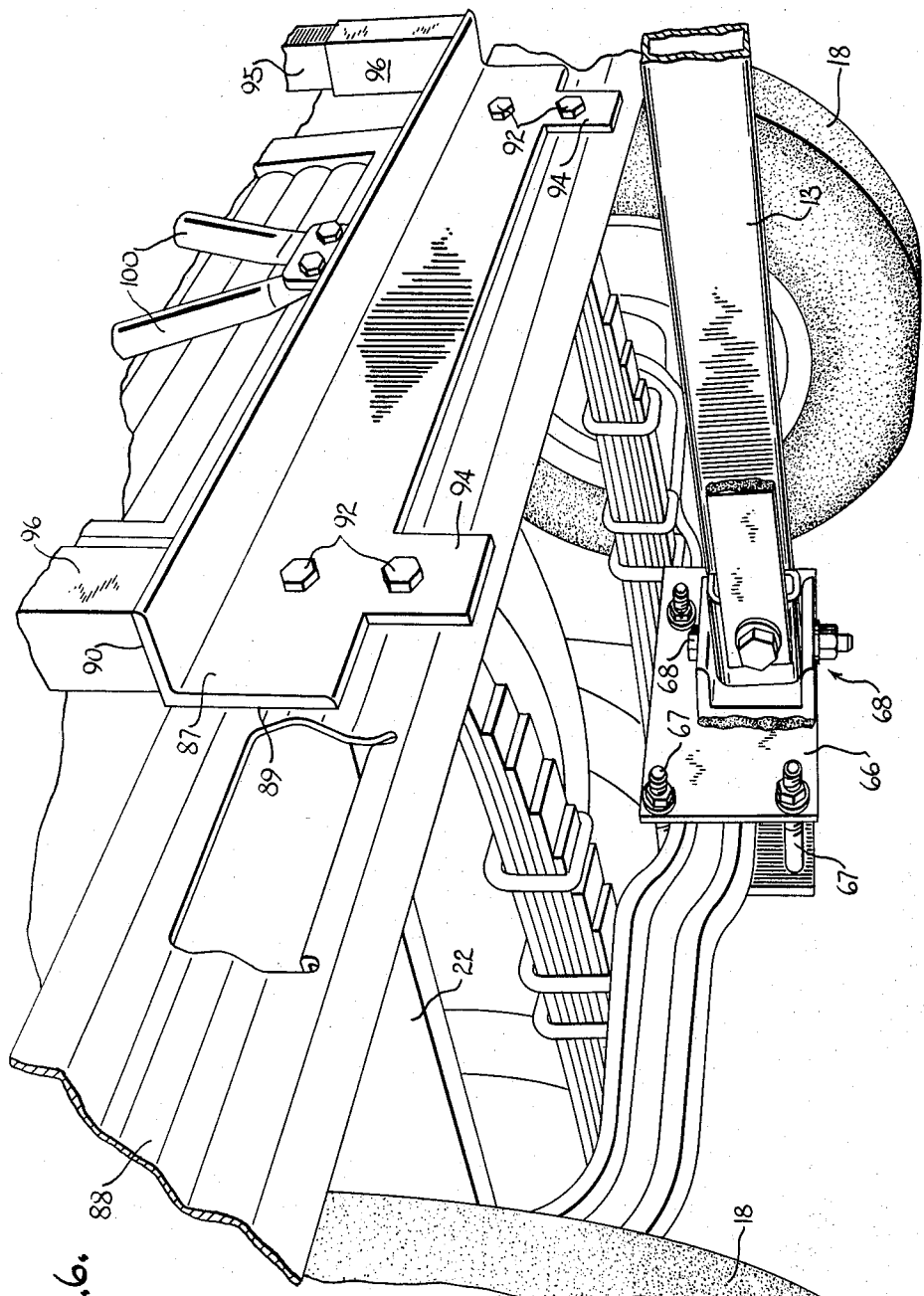

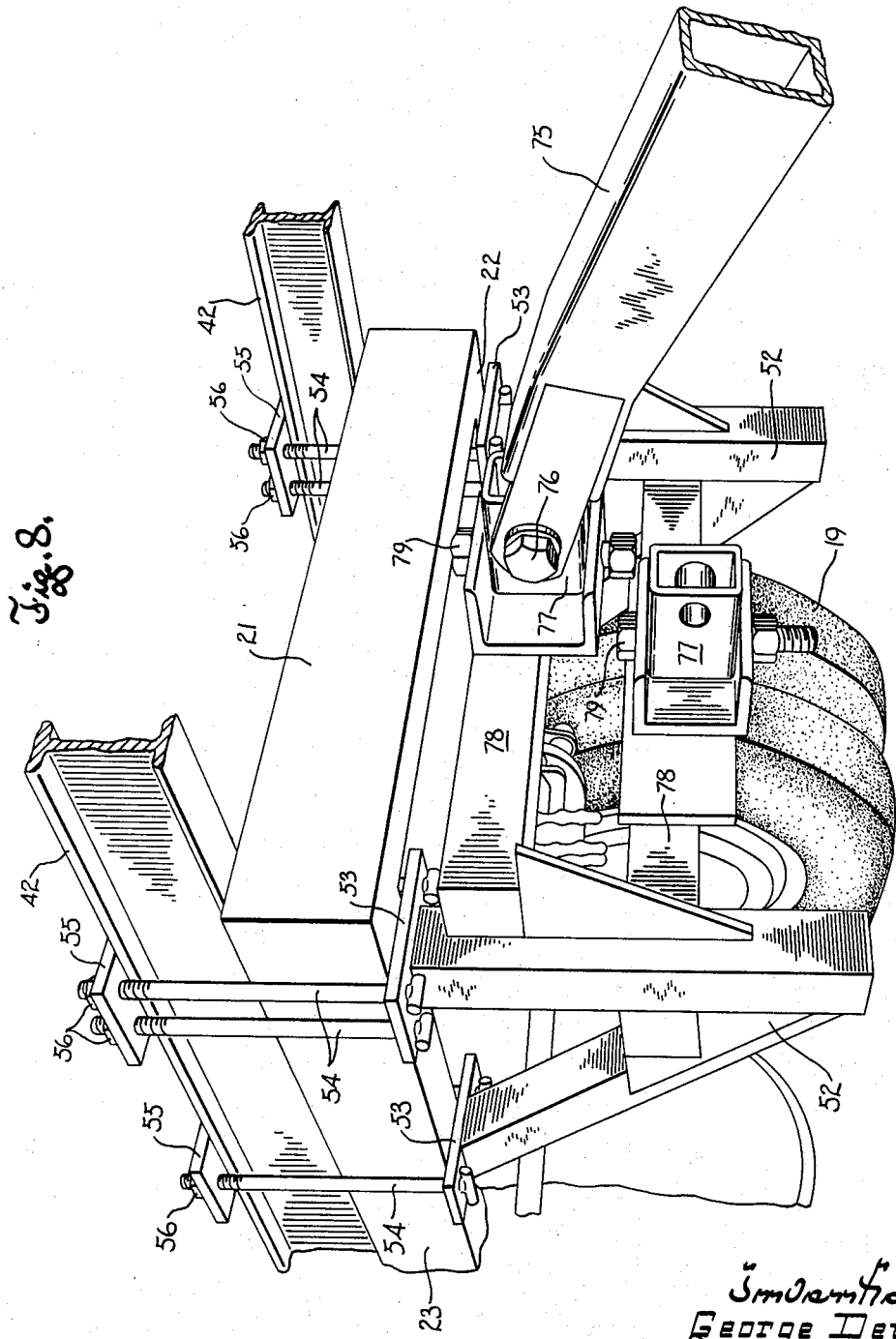

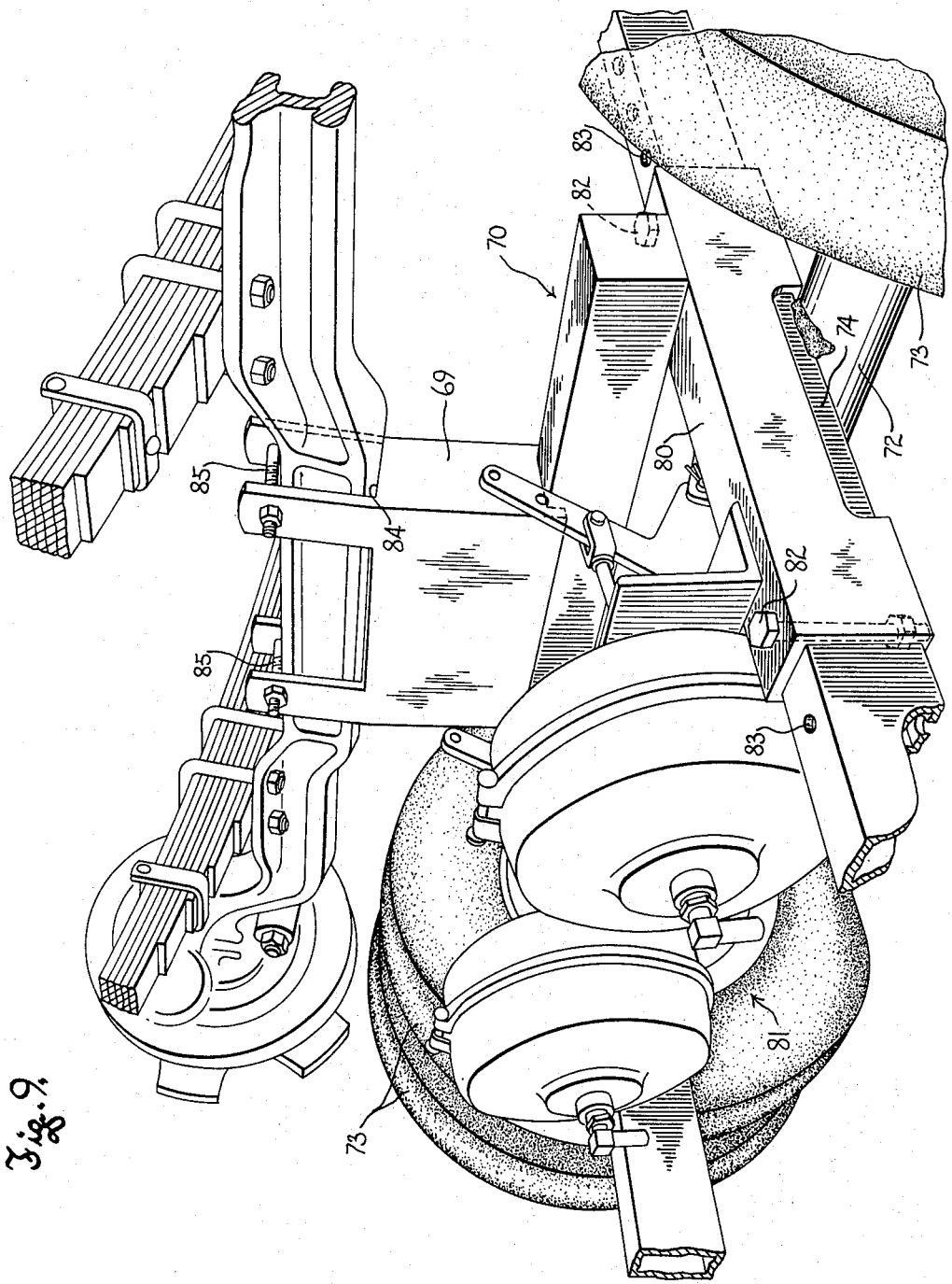

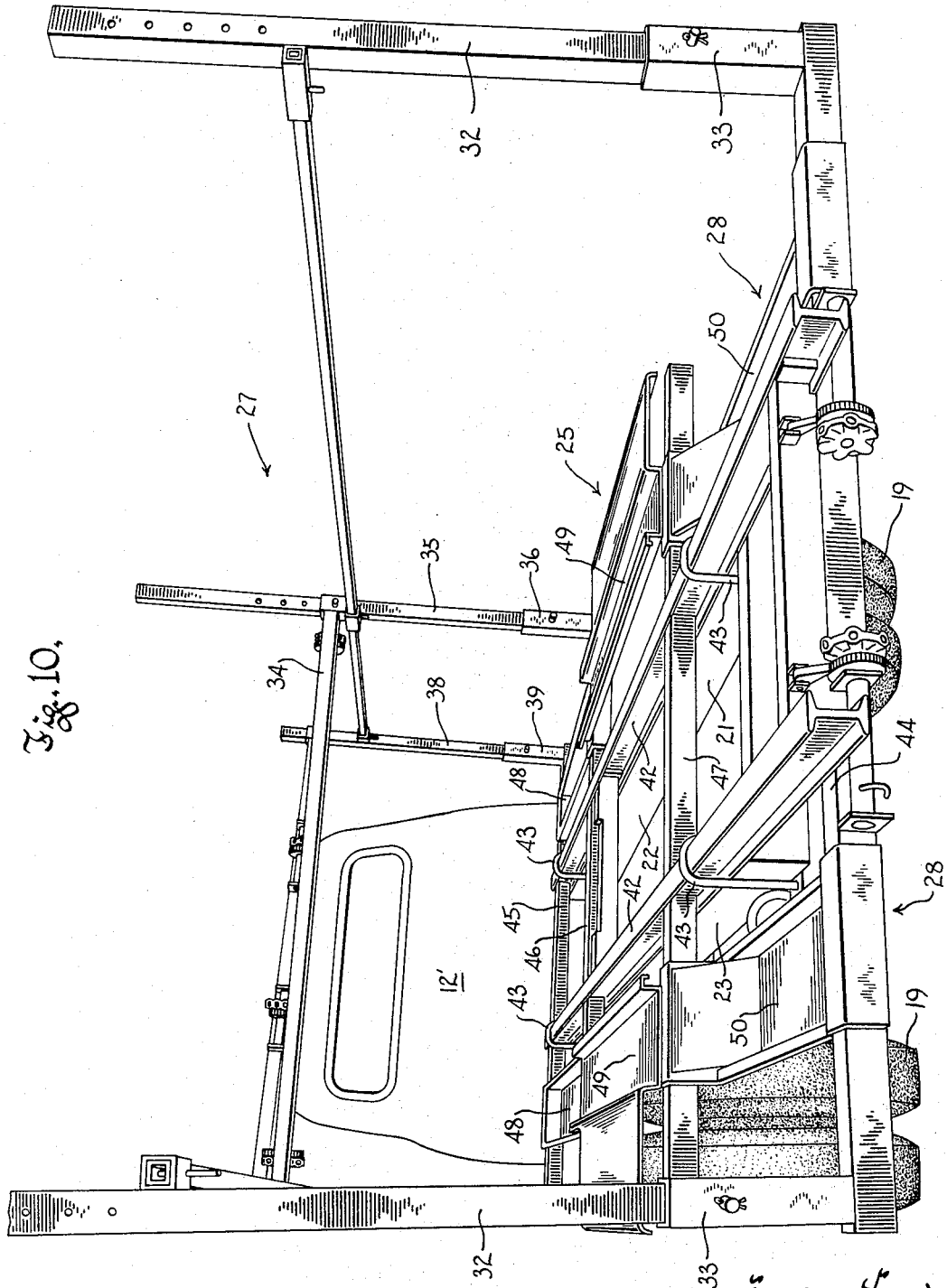

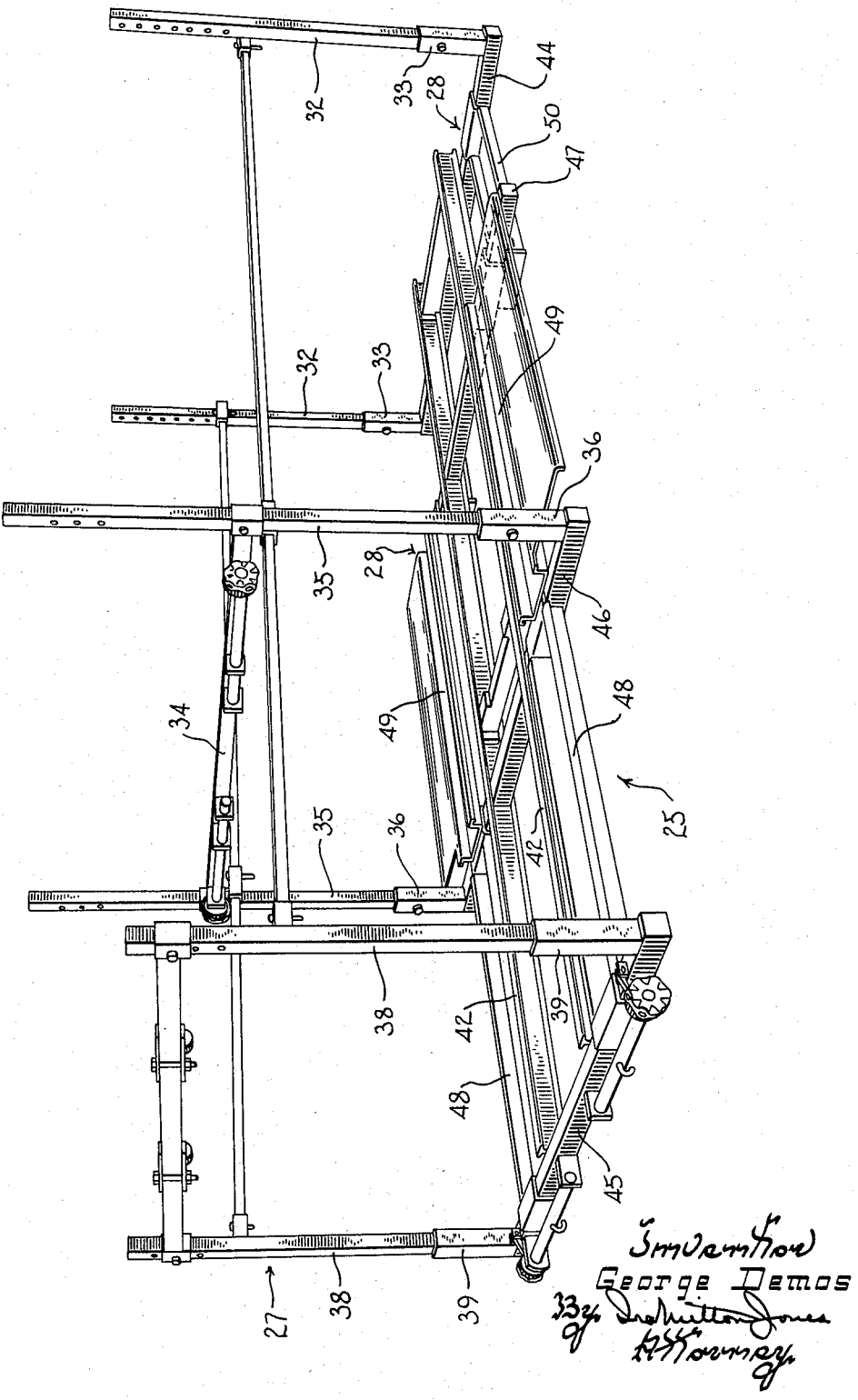

3,334,940
DRIVE-AWAY VEHICLE TRANSPORTING
COMBINATION
George Demos, Racine, Wis. (% Kenosha Auto Transport Corp., 4519 76th St., Kenosha, Wis. 53140)
Filed Feb. 10, 1965, Ser. No. 431,497
6 Claims. (Cl. 296—1)

This invention relates generally to the transportation of automotive vehicles, and has more particular reference to improvements in so called drive-away combinations such as are used for the delivery of new automotive vehicles.

The delivery of automobile vehicles by the drive-away method distinguishes from the more conventional transportation methods involving the use of tractor-trailer combinations in that none of the vehicles comprising the drive-away combination is returned to the point of origin for another pay load. All of the vehicles of a drive-away combination are delivered. This, of course, obviates the need for tractor and trailer transport equipment which is not only very costly, but is operated without a pay load as much as fifty percent of the time.

Despite their advantages, drive-away combinations for transporting automotive vehicles heretofore have been considered inferior due to their limited capacity. The number of vehicles that can be carried by conventional tractor-trailer combinations has always exceeded the maximum number of vehicles comprising a drive-away combination.

With this limitation in mind, it is a purpose of this invention to provide a drive-away combination consisting of as many as four automotive vehicles, wherein one of the vehicles is a truck having readily dismountable means thereon to support the three remaining vehicles. More specifically, it is a purpose of this invention to provide a drive-away vehicle transport combination wherein a pair of four unit combinations such as described can be draft coupled to enable as many as eight vehicles to be transported under the control of a single driver for the lead truck.

Another purpose of this invention resides in the provision of means to adapt a truck of the type having a forwardly located cab and a frame portion behind the cab, for the support of a pair of automotive vehicles in super-imposed positions over said frame portion of the truck, and for the support of another automotive vehicle over the cab of the truck.

In this respect, it is a purpose of this invention to provide a simple subframe which can be readily attached to the bodiless rear frame portion of a truck to support a first automotive vehicle at a low level on the subframe, and wherein readily dismountable superstructure carried by the subframe provides for the support of a second vehicle on the subframe, over a low level vehicle thereon.

Still another purpose of this invention resides in the provision of a drive-away combination characterized by draft coupled front and rear trucks, each capable of carrying two or more automotive vehicles.

A further purpose of the invention is to provide a drive-away combination characterized by lead and trailing trucks, wherein the trailing truck is draft coupled to the lead truck with the front of the trailing truck elevated and only its rear wheels at road level.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate two complete examples of the physical embodiments of the invention, constructed according to the best modes so far devised for the practical application of the principles thereof, and in which:

FIGURE 1 is a side elevational view of an eight unit drive-away vehicle transporting combination embodying this invention;

FIGURE 2 is an enlarged side elevational view of the lead truck of the drive-away combination shown in FIGURE 1 but with its load removed;

FIGURE 3 is a front perspective view of the truck seen in FIGURE 2;

FIGURE 4 is a fragmentary perspective view showing the truck frame and bracket to which the front superstructure frame is attached;

FIGURE 5 is an enlarged perspective view showing the tow bar and hitch connection at the rear of the lead truck;

FIGURE 6 is a perspective view showing the tow bar connection to the front axle of the trailing truck;

FIGURE 8 is a perspective view showing the type of hitch bracket that can be attached to the rear of the lead truck to provide alternate hitch connections for either a tow bar or the dolly seen in FIGURE 7;

FIGURE 9 is a perspective view showing how the front axle of the trailing truck of FIGURE 7 is supported on a bolster carried by the dolly;

FIGURE 10 is a rear perspective view showing how the subframe and its superstructure is detachably secured to each truck; and FIGURE 11 is a perspective of one of the subframes and its superstructure, removed from its truck, and viewing the same from one front corner thereof.

Figure 7:
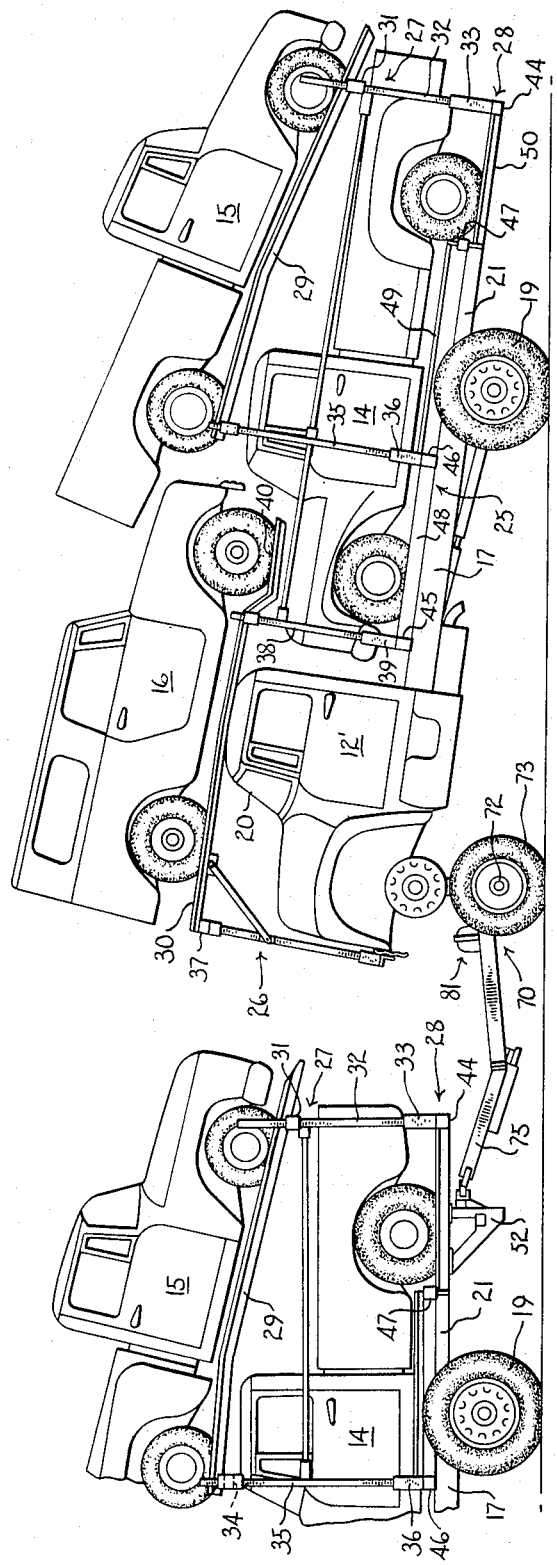
FIGURE 7 is a side elevational view of another embodiment of the invention, wherein the front axle of the trailing truck is supported in an elevated position on a dolly which is coupled to rear of the lead truck.

Referring now more particularly to the drawings, wherein like reference characters identify like parts throughout the views, the numeral 10 generally designates an eight unit drive-away combination of this invention. It comprises a lead truck 11, a trailing truck 12 draft coupled to the rear of the lead truck as by a tow bar 13, and three automotive vehicles 14, 15 and 16 carried by each truck.

It is important to this invention that the trucks 11 and 12 be of similar construction. As here shown, they are preferably of a long wheelbase type comprising an elongated chassis 17 having a pair of front wheels 18, two pairs of coaxial rear wheels 19, a forwardly located cab 20, and a bodiless frame portion 21 rearwardly of the cab extending a distance beyond the rear wheels 19. As is customary, the chassis frame is comprised of a pair of elongated channel shaped beams 22 and 23 which are generally parallel and spaced apart a distance less than the width of the truck.

Two of the automotive vehicles 14 and 15 are located in superimposed positions over the frame portion 21 of each truck, and the third automotive vehicle 16 is located over the cab 20 of each truck. All of the vehicles comprising the drive-away combination shown are made by the same manufacturer. By way of example, the two superimposed vehicles 14 and 15 on each truck 11-12 have been illustrated as pick-up trucks, while the third vehicle 16 has been shown as the type known as a "Scout." All of the vehicles 14, 15 and 16 carried by the trucks 11 and 12, of course, are substantially smaller than the trucks.

According to this invention, each of the trucks 11 and 12 is equipped with substantially light weight and readily dismountable structure to adapt it for carrying the three vehicles 14, 15 and 16 in the transit positions shown.

This structure comprises a horizontal support, here shown as an elongated subframe 25 which rests upon and is detachably secured to the bodiless frame portion 21 of each truck, behind the cab 20 thereof, an auxiliary upright frame 26 which rests upon and is detachably secured to the bumper of each truck, and dismountable superstructure 27 on the subframe. The subframe extends a distance rearwardly beyond the rear of the frame of the truck, and is provided with spaced tracks generally designated 28, formed as a part thereof, to receive the wheels of the low level automotive vehicle 14 so that the latter is supported directly upon the subframe.

A second pair of tracks 29 is dismountably carried by the superstructure 27, to receive the wheels of the upper rear automotive vehicle 15 and support the same in a downwardly and rearwardly inclined position over the low level vehicle 14. A third pair of tracks 30 is dismountably carried jointly by the superstructure 27 and by the upright front frame 26, to receive the wheels of the vehicle 16 and support the same at a high level over the cab of the truck.

The rear end portions of the tracks 29 are detachably connected to a cross bar 31, upon which they rest, and the cross bar in turn is detachably and adjustably pinned to the upper end portions of a pair of opposite upright posts 32 that are dismountably stepped and pinned in sockets 33 on the rear of the subframe, and form part of the superstructure 27. The forward portions of the tracks 29 are similarly supported by and detachably connected to a cross bar 34, which in turn is similarly connected to the upper end portions of a pair of opposite superstructure posts 35 that are dismountably stepped and pinned in sockets 36 on the subframe intermediate its ends. It should be here noted that the inclined positions of the tracks 29 and the vehicle 15 thereon provides a space between the forward ends of the superimposed vehicles 14 and 15, in which the rearwardly facing end of the front vehicle 16 is accommodated.

The forward end portions of the front tracks 30 rest upon and are detachably connected to a cross bar 37 at the top of the upright frame 26, while the rear portions of these tracks are supported by a cross bar detachably and adjustably pinned to the upper portions of a third pair of superstructure posts 38 that have their lower ends dismountably stepped in and pinned to sockets 39 on the front of the subframe. The rear end portions of the tracks 30 are offset downwardly as at 40, so as to enable the rearwardly facing end of the upper front vehicle 16 to properly nest in the space between the forward ends of the superimposed vehicles 14 and 15.

In a general way, the superstructure 27 and the detachable connections between its components follows the teachings of Patent No. 2,684,264, issued to Nicholas Demos on Oct. 24, 1952.

As stated previously, the subframes 25 rest upon and are detachably connected to the rear frame portions 21 of their respective trucks 11 and 12. For this purpose, each subframe comprises a rigidly fabricated framework having a pair of longitudinal beams 42 which are located inwardly adjacent to the subframe tracks 28 and are spaced to rest upon the frame beams 22–23 of the truck chassis. The beams 42 can be readily detachably secured to the chassis beams by pairs of fore and aft U-bolts 43.

The subframe further comprises a rear cross beam 44 which passes under the rear ends of the longitudinal beams 42 and is secured to the latter, a forward cross beam 45 connected across the front ends of the beams 42, and a pair of intermediate cross beams 46 and 47 which pass through the longitudinal beams 42 and are spaced from one another and from the end beams. All of these cross beams project beyond the outer sides of the subframe tracks 28, which are joined to the cross beams, and the beams 44, 45 and 46 have the aforementioned sockets 33, 39 and 36 respectively for the superstructure posts welded or otherwise secured thereto at their ends.

Though not always essential, each of the subframe tracks 28 has been shown as comprised of three track sections. The forward track section 48 extends between the two forward cross beams 45 and 46 and is welded thereto with its bottom slightly offset downwardly from the top of the subframe. The intermediate track section 49 is welded to the two intermediate cross beams with its bottom resting upon them. This track section normally extends over the inner rear wheels of the truck chassis, and it is widened so as to extend laterally outwardly over the outer wheels to provide a fender therefor. The rear track section 50 extends between the rear cross beam and the adjacent intermediate cross beam, to which the section is welded or otherwise secured with its bottom offset downwardly a substantial distance from the top of the subframe. The rear track sections 50 thus in effect provide wheel wells for the rearward wheels on the low level automotive vehicle 14.

With the types of automotive vehicles shown supported on the lead and trailing trucks, the low level vehicle 14 preferably faces forwardly, and the two upper level vehicles 15 and 16 preferably face rearwardly. This orientation, however, may be varied to suit different types of vehicles to be loaded onto the subframe and the superstructure.

The cross bars on the superstructure, of course, may be provided with suitable tie down mechanisms of conventional types such as shown, which allow the bodies of the vehicles supported on the trucks to be drawn down on their springs. Also, bracing such as shown best in FIGURES 2 and 11 may be employed to lend rigidity to the superstructure.

As stated previously, the lead and trailing trucks 11 and 12 are draft connected by a tow bar 13. The forward end of the tow bar is connected to a hitch unit 51 that is readily detachably secured to the rear of the chassis on the lead truck 11 in the manner seen best in FIGURE 5. As therein seen, the hitch unit 51 is a rigid fabricated structure comprising opposite V-shaped side frames 52 having flat cleats 53 on the extremities of their legs engaging the undersides of the chassis beams 22 and 23 at the rear of the lead truck 11. Tie rods 54 that are located at opposite sides of each of the longitudinal chassis and subframe beams pass upwardly through registering holes in the cleats 53 and in cooperating plates 55 that rest upon the tops of the longitudinal beams 42 of the subframe. Nuts 56 threaded on the opposite ends of these tie rods serve to detachably clamp the rear of the subframe to the truck chassis and to also dismountably attach the hitch bracket to the rear of the chassis on the lead truck.

The two side frames of the hitch bracket are joined by a single cross beam 57 located in the crotches of the V-shaped frames so as to be located about level with the axis of the rear wheels of the truck. The forward end of the tow bar has a gimbal joint connection 58 with this cross beam at a location medially of its ends. The gimbal joint connection is provided by a channel shaped bracket 60 secured to the cross beam 57 with its flanges horizontal and facing rearwardly, a block 61 which fits between the flanges of the channel bracket 60 and is swingably mounted on a vertical bolt 62 carried by said bracket, and a horizontal pivot defining bolt 63 carried by the block and passing through apertures in bifurcations 64 on the front of the tow bar, which bifurcations embrace the block. Hence, the tow bar can be disconnected from the lead truck merely by removal of the horizontal bolt 63.

When the hitch unit is attached to the rear of the lead truck as described above, the rear tie rods 54 take the place of the rear U-bolts 43 described earlier.

The rear of the tow bar is attached to the front axle of the trailing truck 12 in the manner best seen in FIGURE 6, where a bracket 66 is shown detachably clamped to the midportion of the axle by bolts 67, and the tow bar has a forked rear end portion which is detachably secured to the bracket by a gimbal joint connection 68 similar to the connection 58 described previously.

These connections between the tow bar and the lead and trailing trucks, of course, allow each end of the tow bar to swing up and down about a horizontal axis transversely of the trucks, while the forward end of the tow bar can swing from side to side about a vertical axis.

If desired, the hitch unit seen in FIGURE 8 can be used to advantage, especially in instances where the trailing truck 12' is supported on the bolster 69 of a dolly 70, with its front end elevated and only its rear wheels at road level. In such cases, the front wheels of the trailing truck are removed and carried in the body of one of the pickup trucks 14 or 15.

The dolly 70 has a chassis comprising a single axle 72 with pairs of wheels 73 on each end thereof, and a frame comprised of a pair of elongated beams which have spaced apart parallel rear portions 74 resting on and secured to the axle 72, and convergent front portions which are joined to a common forked member 75 that is the equivalent of the forward end of the tow bar described earlier. The forked member 75 can be pivotally connected by a horizontal bolt 76 with either an upper or a lower block 77, both blocks being supported on cross bars 78 on the hitch unit for side to side swinging motion about vertical bolts 79.

The bolster 69 is secured to slides 80 having tubular portions that slideably embrace the horizontal rear portions 74 of the chassis beams on the dolly to enable the effective length of the dolly to be adjusted. These slides also carry cylinders, generally designated 81, by which the rear wheel brakes of the trailing truck can be operated concomitantly with the brakes of the lead truck. Bolts 82 passing through holes in the slides and engaged in any of a number of holes 83 in the rear portions 74 of the chassis beams on the dolly hold the bolster in the desired position of adjustment.

The front axle of the trailing truck is received in an upwardly opening channel 84 on the top of the bolster, and bolts 85 passing through the flanges of this channel, above the axle, serve to detachably clamp the latter to the bolster.

The upright front or auxiliary frames 26 also comprise readily dismountable superstructures that are detachably secured to the fronts of the leading and trailing trucks 11 and 12 in an exceptionally simple but safe way, as seen best in FIGURES 3, 4 and 6. Each of these frames comprises a lower cross beam 87, such as a sturdy angle iron that extends lengthwise along the front of the bumper 88 of its truck, with its back 89 to the bumper and its other flange 90 extending horizontally forwardly at the top of the angle iron. Hooks 91 welded to the top flange of the angle are engaged over the top edge of the bumper 88, and cooperate with pairs of bolts 92 by which the angle is readily detachably bolted to the bumper supporting brackets 93 on the front ends of the frame beams 22 and 23 to rigidly mount the lower cross beam of the front frame on the truck. Tabs 94 welded to the back of the beam 87 and projecting downwardly therefrom are suitably apertured to receive the lower bolts 92.

With this mounting for the frames, it will be appreciated that the bolts 92 are longer substitutes for those that had originally secured the bumper 88 to the chassis carried bumper supporting brackets 93.

Each of the front frames also includes a pair of upright superstructure posts 95 having their lower end portions stepped in sockets 96 welded to the top flange 90 of the angle beam 87, and dismountably held in the sockets by pins 97. The cross bar 37 at the top of each front frame is supported by the posts 95 as by means of sleeves 98 fixed to the underside of the cross bar 37, which are engaged over the tops of the posts and held connected thereto by pins 99. Angled braces 100 may be connected between the posts 95 and the lower cross beam 87 as shown, to reinforce the front frame.

The loading operation, which is the same for each of the trucks 11–12, is deemed more or less obvious from the description thus far. Briefly, the subframe 25 is first placed upon the bodiless frame portion of each truck, behind its cab. This can be readily accomplished by backing the truck under the subframe while the latter is temporarily supported in an elevated position by tripods, jacks or the like. Fork lift trucks can also be used for this purpose.

After the subframe has been secured to the truck chassis by the U-bolts 43 and/or tie rods 54 which also hold the hitch unit 51 on the rear of the lead truck, the low level vehicle 14 can be run up on temporary ramps (not shown) onto the subframe tracks and tied down in the usual manner. The superstructure for supporting the upper front vehicle 16 can then be erected, and said vehicle is also run up on temporary ramps to its position over the cab of the truck, and then tied down in the conventional manner. The rear superstructure can then be erected to receive the rear high level vehicle 15, which is also run up on temporary ramps and tied down in the usual fashion.

When both trucks have been loaded in the manner described, the tow bar, or alternatively the dolly, can be connected between the lead and trailing trucks and the eight unit drive-away combination is ready for the road.

The unloading sequence can be the reverse of the loading procedure described, although it will be apparent that either the front high level vehicle 16 on the lead truck or the rear high level vehicle 15 on the trailing truck can be the first to be unloaded. Ordinarily, the vehicles on the trailing truck are the first to be delivered, and this is accomplished by first unloading the upper rear vehicle 15, followed by the lower rear vehicle 14, and finally the front vehicle 16. The latter can, if desired, be run down temporary ramps over the rear chassis portion of the trailing truck and others leading downwardly from the rear of the subframe to ground level.

After the trailing truck itself is delivered, the front combination of either three or four vehicles can continue to other delivery points if necessary.

The subframes and superstructures, as well as the tow bar or dolly can be left at the terminals to which the trucks 11–12 are delivered, to be picked up later by a follow-up truck.

From the foregoing description, together with the accompanying drawings, it will be readily apparent to those skilled in the art that this invention for the first time makes possible the delivery of as many as eight automotive vehicles by the drive-away method of vehicle transportation.

What is claimed as my invention is:

1. An eight unit drive-away combination for automotive vehicles all of which are to be delivered to destinations remote from their origin, comprising:
(A) front and rear trucks each having a forwardly located cab, and an elongated bodiless frame portion rearwardly of the cab;
(B) means providing a readily detachable draft connection between said trucks, comprising a dolly having an axle with wheels on its opposite ends, a tongue connecting with the axle and coupled to the rear of the front truck, and a bolster secured to and supporting the front axle of the rear truck with the forward end of the latter at a higher elevation than its rear end;
(C) a subframe detachably secured to said frame portion of each truck;
(D) structure on each of said subframes supporting a pair of automotive vehicles in superimposed positions over said frame portion of the truck;

(E) and dismountable superstructure means mounted on the front of each truck and cooperating with said structure on the subframe thereof in supporting another automotive vehicle in an elevated position over the cab of the truck.

2. Structure providing a subframe which can be supported on and detachably secured to the bodiless rear frame of a truck to adapt the truck for the transportation of an automotive vehicle, comprising:
 (A) a substantially horizontal framework having
  (1) longitudinal beams spaced apart a distance substantially corresponding to the width of the frame on a truck for which the subframe is intended, and which are adapted to rest upon the truck frame;
  (2) cross beams rigidly joined to said longitudinal beams and projecting beyond the sides thereof, there being a cross beam at each end of the longitudinal beams and a pair of intermediate cross beams spaced from one another and from said end beams;
  (3) and track forming members carried by and spanning the spaces between said cross beams outwardly of the longitudinal beams, to receive the wheels of an automotive vehicle to be supported on the subframe, the track forming members which span the spaces between each end cross beam and its adjacent intermediate cross beam being at a lower elevation than those carried by the intermediate cross beams.

3. The subframe structure of claim 2, wherein the intermediate track forming members are adapted to extend over the wheels of a truck having the subframe thereon, and wherein said intermediate track forming members are extended laterally to provide fenders over the rear wheels of the truck.

4. Structure providing a subframe which can be supported on and detachably secured to the bodiless rear frame of a truck to adapt the truck for the transportation of an automotive vehicle, comprising:
 (A) a substantially horizontal framework having
  (1) longitudinal beams spaced apart a distance substantially corresponding to the width of the frame on a truck for which the subframe is intended, and which are adapted to rest upon truck frame;
  (2) cross beams rigidly joined to said longitudinal beams and projecting beyond the sides thereof, there being a cross beam at each end of the longitudinal beams and a pair of intermediate cross beams spaced from one another and from said end beams;
  (3) track forming members carried by and spanning the spaces between said cross beams outwardly of the longitudinal beams, to receive the wheels of an automotive vehicle to be supported on the subframe;
 (B) opposite upright posts detachably carried by certain of said cross beams and rising from the outer end portions thereof, outwardly of said track forming members;
 (C) and upper track forming members supported by said posts to receive the wheels of a second automotive vehicle to be supported by the subframe.

5. In a four vehicle drive-away combination consisting entirely of untitled new automotive vehicles all of which are to be delivered from the center of their manufacture to sales outlets in cities remote therefrom, and wherein one of said vehicles serves as a tractor and comprises a standard production model truck having a chassis with front and rear wheels, a forwardly located cab, and an elongated bodiless rear frame portion behind the cab disposed at a level above the axes of the wheels and adjacent to their tops;
 (A) an elongated substantially horizontal subframe resting on and readily detachably connected to said rear frame portion of the truck and having means thereon to receive the wheels of a second one of said vehicles to support the latter at a low level on the truck behind its cab;
 (B) rear superstructure dismountably connected to and carried by the subframe and having means thereon to receive the wheels of a third one of said vehicles to support the same at a higher level on the truck, in a transport position over said second vehicle, said rear superstructure comprising upright supporting means connected to and rising from the front of the subframe and located adjacent to the rear of the cab on the truck;
 (C) and readily dismountable forward superstructure carried by the front portion of the truck chassis and having elongated wheel receiving means thereon to support the fourth vehicle in a transit position over the cab of the truck, the rear portion of said last named wheel receiving means being detachably carried by said upright supporting means of the rear superstructure.

6. An eight vehicle drive-away combination comprising two such combinations as claimed in claim 5, and means providing a readily detachable draft connection between the rear of one truck and the front of the other truck, whereby one driver in the lead truck is able to transport eight automotive vehicles from the center of their manufacture to sales outlets in cities remote therefrom.

References Cited

UNITED STATES PATENTS

| | | |
|---|---|---|
| 2,471,521 | 5/1949 | Galey. |
| 2,647,009 | 7/1953 | Huebshman. |
| 2,694,597 | 11/1954 | Kunz. |
| 3,100,124 | 8/1963 | Demos. |

FOREIGN PATENTS

| | | |
|---|---|---|
| 1,188,175 | 9/1959 | France. |

BENJAMIN HERSH, *Primary Examiner.*

PHILLIP GOODMAN, *Assistant Examiner.*